(12) United States Patent
Ubowski et al.

(10) Patent No.: US 7,035,396 B1
(45) Date of Patent: Apr. 25, 2006

(54) CONFIGURABLE ECHO CANCELLER

(75) Inventors: Richard M. Ubowski, Harleysville, PA (US); Vasu Iyengar, Allentown, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/235,319

(22) Filed: Jan. 22, 1999

(51) Int. Cl.
*H04M 9/08* (2006.01)
(52) U.S. Cl. .......................... 379/406.01; 379/399.01; 370/286
(58) Field of Classification Search ................ 379/410, 379/406.01–406.16, 406; 381/66, 71.11, 381/71.12; 370/290, 286; 708/322, 323
See application file for complete search history.

(56) References Cited

U.S. PATENT DOCUMENTS

| | | | | |
|---|---|---|---|---|
| 3,894,200 A | * | 7/1975 | Campanella et al. | 379/406.11 |
| 4,574,166 A | * | 3/1986 | Gritton | 370/290 |
| 4,582,963 A | * | 4/1986 | Danstrom | 379/406.08 |
| 5,502,717 A | * | 3/1996 | Park | 370/286 |
| 5,566,167 A | * | 10/1996 | Duttweiler | 370/290 |
| 5,587,998 A | * | 12/1996 | Velardo et al. | 370/289 |
| 5,663,955 A | * | 9/1997 | Iyengar | 370/291 |
| 5,687,229 A | * | 11/1997 | Sih | 379/406.09 |
| 5,721,772 A | * | 2/1998 | Haneda et al. | 379/406.14 |
| 6,201,866 B1 | * | 3/2001 | Ariyama et al. | 379/406.01 |
| 6,385,176 B1 | * | 5/2002 | Iyengar et al. | 370/286 |

* cited by examiner

*Primary Examiner*—Sinh Tran
*Assistant Examiner*—Walter F Briney, III

(57) ABSTRACT

A configurable adaptive echo canceler which can perform acoustical echo cancellation (AEC) or hybrid echo cancellation (HEC) under software control. Particular parameters based on the particular application can be associated with either a suitable AEC or a suitable HEC, and the parameters are made selectable through the use of a control register. Exemplary parameters are accuracy of filter coefficients, a span select to manipulate the expected length of the echo path, a step size to adjust the adaptation of the echo cancellation, enablement of a tap update, selection of adaptation mode, center clipper selection, and sub-band or full-band echo cancellation. With the use of audio line switching, the configurable echo canceler can allow various modes of operation of the telephone, some of which may require an AEC in the installed unit and/or some of which may require an HEC. For instance, in a cordless telephone application, in an intercom mode, a configurable echo canceler in a cordless handset receiver and a configurable echo canceler in a base unit may each be configured as AECs. In a base speakerphone mode, the configurable echo canceler in the base unit may be configured to provide both HEC and AEC, while the configurable echo canceler in the cordless handset receiver may be configured as an AEC. In a handset speakerphone mode, the configurable echo canceler in the base unit may be configured as an HEC, while the configurable echo canceler in the cordless handset receiver may be configured as an AEC.

36 Claims, 5 Drawing Sheets

CONTROL REGISTER

BASE UNIT
HEC

| A | MICROPHONE-IN |
|---|---|
| B | TELEPHONE LINE-OUT |
| C | TELEPHONE LINE-IN |
| D | SPEAKER OUT |

FIG. 4B

BASE UNIT
AEC

| A | LINE-IN |
|---|---|
| B | SPEAKER OUT |
| C | MICROPHONE-IN |
| D | LINE-OUT |

FIG. 5

HANDSET
AEC

| A | MICROPHONE-IN |
|---|---|
| B | HANDSET-OUT TO BASE OR TO HANDSET |
| C | HANDSET-IN FROM BASE OR HANDSET |
| D | HANDSET SPEAKER |

CONFIGURABLE ECHO CANCELLER

BACKGROUND OF THE INVENTION

1. Field of the Invention

This invention relates generally to echo cancellation. More particularly, it relates to a configurable echo canceller which adapts between audio echo cancellation and/or hybrid echo cancellation based on the particular application.

2. Background of Related Art

An echo canceller is an electrical device which removes interfering information from a signal caused by an electrical or acoustical echo of the signal. Echo cancellation has many uses, but is well known for its use in telephone systems to remove echoes during a conversation on a telephone line.

Electrical echoes are most typically caused in customer premises telephone equipment (e.g. a telephone) when a signal passes through a hybrid (otherwise known as a telephone line interface (TLI)) to the telephone line. A hybrid provides isolation between the telephone and the telephone line. The better the hybrid, i.e., the better the isolation, the larger the reflection or echo of the signal back into the telephone. A conventional device used at the customer premises telephone equipment to eliminate the effect of reflections or echoes caused by the hybrid are generically termed hybrid echo cancellers (HECs).

Other reflections of a telephone signal causing audible echoes in the conversation are caused by the physical environment in which the telephone sits. For instance, acoustical reflections are caused from the speaker back to a microphone in the telephone when sounds output from the speaker are picked up by the microphone. This most frequently occurs when the output sound bounces off the ceiling, walls and other structures in the room. Acoustical reflections typically cause uncomfortable feedback such as squealing in the signal output from the speaker.

Different acoustical reflections or echoes may also be caused at different times, depending on the distance between the speaker, the particular reflecting surface (e.g., the ceiling or any of the four walls), and the return path to the microphone. For instance, an acoustical echo would be caused on a telephone line a fixed amount of time after the speech originated. This fixed amount of time is based on the time it takes sound to travel from the speaker, to the reflecting surface, and then to the microphone. Not all rooms are the same size, nor is a telephone placed in the same spot in all rooms. Thus, because of the uncertainty as to the particular dimensions of a room and the proximity of the telephone to the walls and/or other structures in the room, it is difficult to know beforehand the specific needs of an acoustical echo canceller. Higher end acoustical echo cancellers adaptively train themselves to the particular acoustical echoes experienced by a telephone, while lower end acoustical echo cancellers have predetermined tap values set on the presumption of certain average or median conditions, e.g., 6 feet from the speaker and microphone to the ceiling (assuming that the customer premises telephone equipment is placed on a table), and, e.g., 10 feet from the speaker and microphone to the surrounding wall surfaces. Acoustical echo cancellers are most prevalent in speakerphone type applications.

Initially, echo cancellers were analog devices which sampled a pure main signal at a point before it was affected by a reflection or echo, delayed the sampled pure signal, and subtracted the delayed pure signal from the main signal to output a signal corresponding to the pure main signal with the effects of any reflections or echoes removed. Thus, ideally, the delayed pure signal cancels out the reflected signal picked up by the microphone and reintroduced into the main signal.

More recently, particularly as digital signal processors (DSPs) and other high performance processors became cost effective, software algorithms have been developed to perform an acoustical echo cancellation or a hybrid echo cancellation on a digitized signal. Conventional acoustical echo cancellers suppress audio picked up by a microphone which was output by a speaker on the same telephone. These conventional AECs are typically adaptive, speech trained and monitored and adjusted as necessary for optimal performance.

Conventional customer premises telephone equipment includes an acoustic echo canceller and/or a hybrid echo canceller as appropriate for the application. For instance, FIG. 6 shows the relevant portion of a cordless telephone including a cordless handset 602 and a base unit 604. The cordless handset 602 typically includes a microphone and a speaker to allow a telephone conversation to take place, and an acoustical echo canceller 606 to cancel any acoustical echoes caused in the telephone signal. There is typically no hybrid echo canceller in the cordless handset 602 because there conventionally are no hybrids in the cordless handset 602.

On the other hand, the base unit 604 interfaces to a telephone line from a central office via a telephone line interface, i.e., a hybrid. Accordingly, a hybrid echo canceller 608 is typically included in the base unit 604 of a cordless telephone to remove unwanted signal disruptions and noise caused by reflections of the main signal caused by the hybrid in the base unit 604. However, because the base unit 604 does not typically include a speaker and a microphone, there is typically no AEC in the base unit 604.

Accordingly, a designer conventionally picks and chooses an AEC or an HEC based on a particular application, and manufacturers provide either an AEC or an HEC for each particular application. For instance, in a cordless handset 602, a particular AEC might be chosen for use while in the base unit 604, a particular HEC might be chosen. This causes the need to manufacture such a cordless telephone with two separate echo cancellation parts, with associated inventory and costing requirements.

In the event of a combined requirement for both an AEC and an HEC within the same unit, manufacturers will typically customize a combined HEC and AEC for use with the particular application.

Thus, many different types of echo cancelers must be manufactured, inventoried and maintained, e.g., AECs, HECs, and AEC/HEC combinations. Unfortunately, the use of many different types of echo cancelers complicates manufacturing, maintenance, and overall cost.

There is thus a need for an echo canceller which is flexible enough to be used in various echo cancellation roles, including acoustical and/or hybrid echo cancellation roles, to reduce the need for the many different conventional types of echo cancelers.

SUMMARY OF THE INVENTION

In accordance with the principles of the present invention, an echo canceler comprises an echo canceler module capable of configuration as one of an acoustic echo canceler and a hybrid echo canceler. A control register is adapted to configure the echo canceler module as the acoustic echo canceler or the hybrid echo canceler.

A method of configuring an echo canceler module as either an acoustic echo canceler or as a hybrid echo canceler in accordance with another aspect of the present invention comprises configuring the echo canceler module as one of an acoustic echo canceler and a hybrid echo canceler. The echo canceler module is operated in an operation mode utilizing the echo canceler module as configured. The echo canceler module is reconfigured as the other of the acoustic echo canceler and the hybrid echo canceler.

BRIEF DESCRIPTION OF THE DRAWINGS

Features and advantages of the present invention will become apparent to those skilled in the art from the following description with reference to the drawings, in which:

FIGS. 4A and 4B show audio connections of the configurable echo canceler implemented in a base unit as an HEC (FIG. 4A) or as an AEC (FIG. 4B).

FIG. 5 shows audio connections of the configurable echo canceler implemented as an AEC in a cordless handset.

DETAILED DESCRIPTION OF ILLUSTRATIVE EMBODIMENTS

The present invention provides a configurable echo canceller which can perform acoustical or hybrid echo cancellation under software control. In this way, e.g., the same echo canceler can be implemented in each of the cordless handset and the base unit of a cordless telephone but each configured differently, thus reducing manufacturing and maintenance costs.

In the disclosed embodiment, a cordless telephone application includes a configurable echo canceler for separate installations in each of the cordless handset receiver 102 and in the base unit 104. Moreover, in the disclosed cordless telephone application, the configurable echo canceller includes a control register or other device to configure the various configurable features of the echo canceller depending on the application.

For instance, the number of filter taps can be adjusted depending on the mode of the reconfigurable echo canceller. The disclosed configurable echo canceller can also be set for single or double precision taps, for sub-band or full-band operation, and/or for full-band/sub-band center clipper operation with or without comfort noise.

Figure 1:
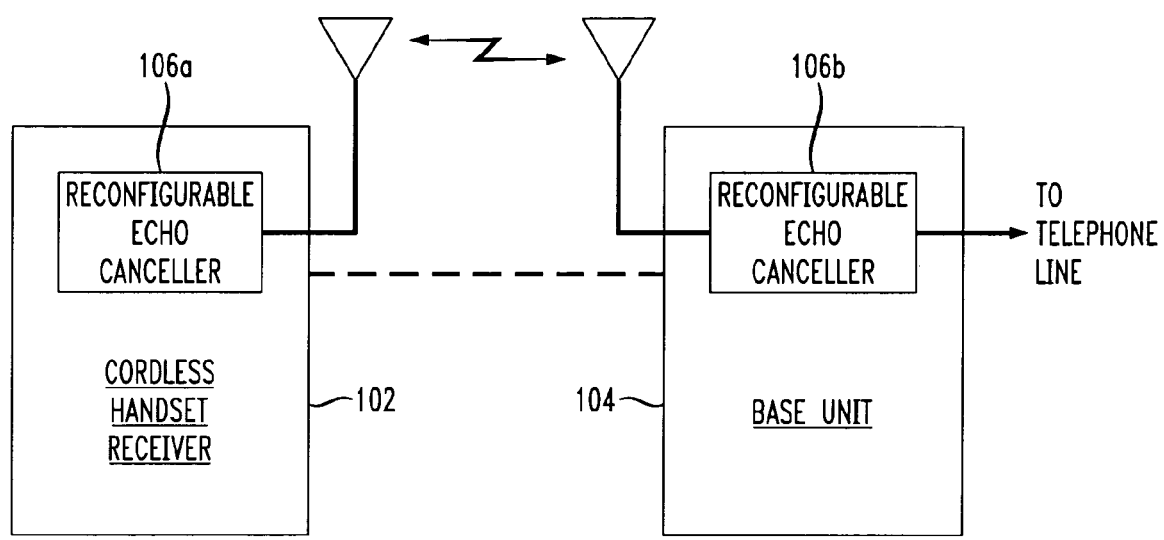
FIG. 1 shows an echo canceler in accordance with the principles of the present invention implemented in each of a cordless handset receiver and a base unit for a cordless telephone system.

FIG. 1 shows a configurable echo canceler 106a, 106b in accordance with the principles of the present invention implemented in each of a cordless handset receiver 102 and a base unit for a cordless telephone system 110.

As configured in the disclosed embodiment, the configurable echo canceler 106a in the cordless handset receiver 102 is software configured (e.g., using a register) to operate in a suitable AEC mode, while a similar configurable echo canceler 106b in the base unit 104 is software configured to operate in a suitable AEC or HEC mode.

Figure 2:
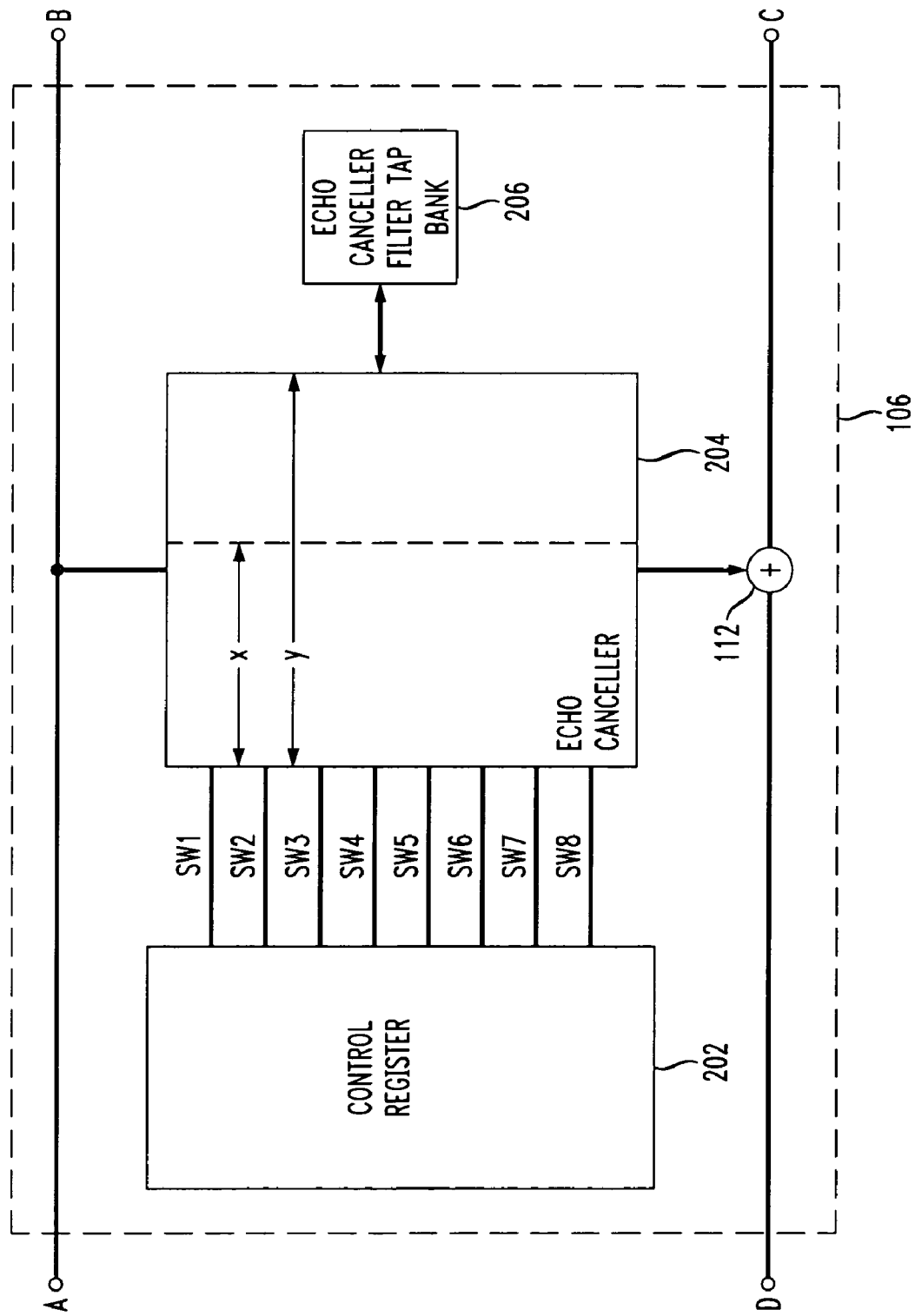
FIG. 2 shows the configurable echo cancelers of FIG. 1 in more detail.

FIG. 2 shows the configurable echo cancelers 106a, 106b of FIG. 1 in more detail.

In particular, in FIG. 2, the configurable echo cancelers 106a, 106b are each formed with an echo canceler module 204, an echo canceler filter tap bank 206, a control register 202, and suitable summation circuitry 112. The same type configurable echo canceler 106 shown in FIG. 2 forms the basis for both of the configurable echo cancelers 106a, 106b shown in FIG. 1.

One difference in the disclosed embodiment between the configurable echo canceler 106a in the cordless handset receiver 102 and the configurable echo canceler 106b in the base unit 104 is their respective configurations, set by a control word stored in a control register 202. Preferably, but not necessarily, the control register 202 is either formed in non-volatile memory or is loaded in an initialization sequence from a program residing in non-volatile memory. Moreover, it is preferred that audio processing in the equipment utilizing the configurable echo canceler 106 be disabled or muted until the configuration of all configurable echo cancelers is assured.

Preferably, each of the configurable echo cancelers 106a, 106b are implemented as a software routine running on a suitable processor, e.g., on a digital signal processor (DSP). In the disclosed embodiment, the configurable echo cancelers are each adapted to have certain adjustable parameters to allow operation as an AEC or as an HEC.

The x and y in FIG. 2 refer to the configurability of the basic unit of memory in the echo canceler 204, e.g., byte (8 bits) or word (16 bits). The accuracy of filter coefficients in the echo canceler 204 is related directly to the number of bits used for the coefficients. For example, increased accuracy can be obtained by using two words vs. one for the coefficients. Accordingly, in configuring the echo canceler 106 as either an AEC or as an HEC, one may preferably use single precision for configuration as an AEC (i.e., using byte length coefficients), and double precision for configuration as an HEC (i.e., using word length coefficients).

Figure 3:
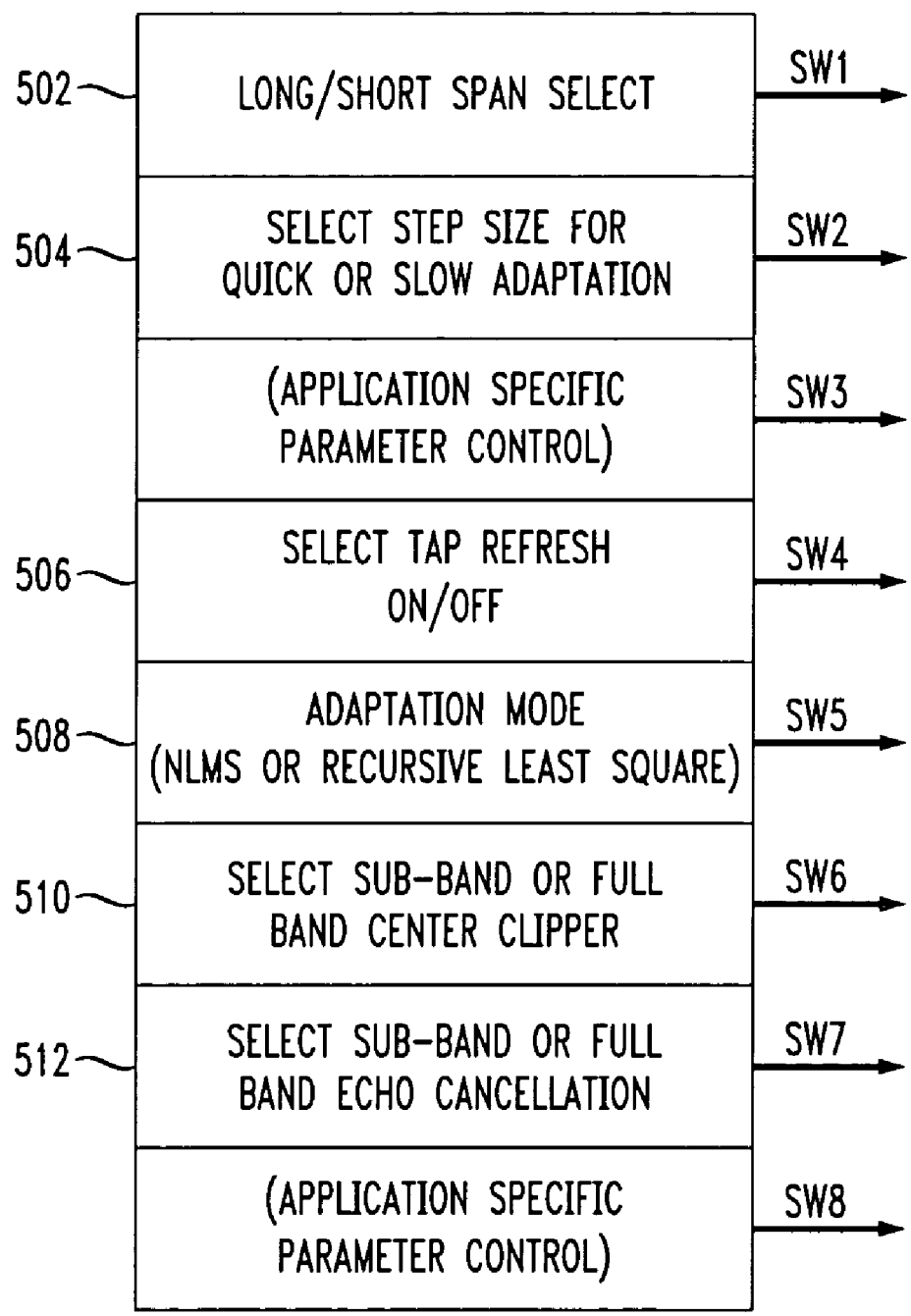
FIG. 3 shows an exemplary control register controlling exemplary switchable parameters of the configurable echo canceler shown in FIG. 2.
Figure 6:
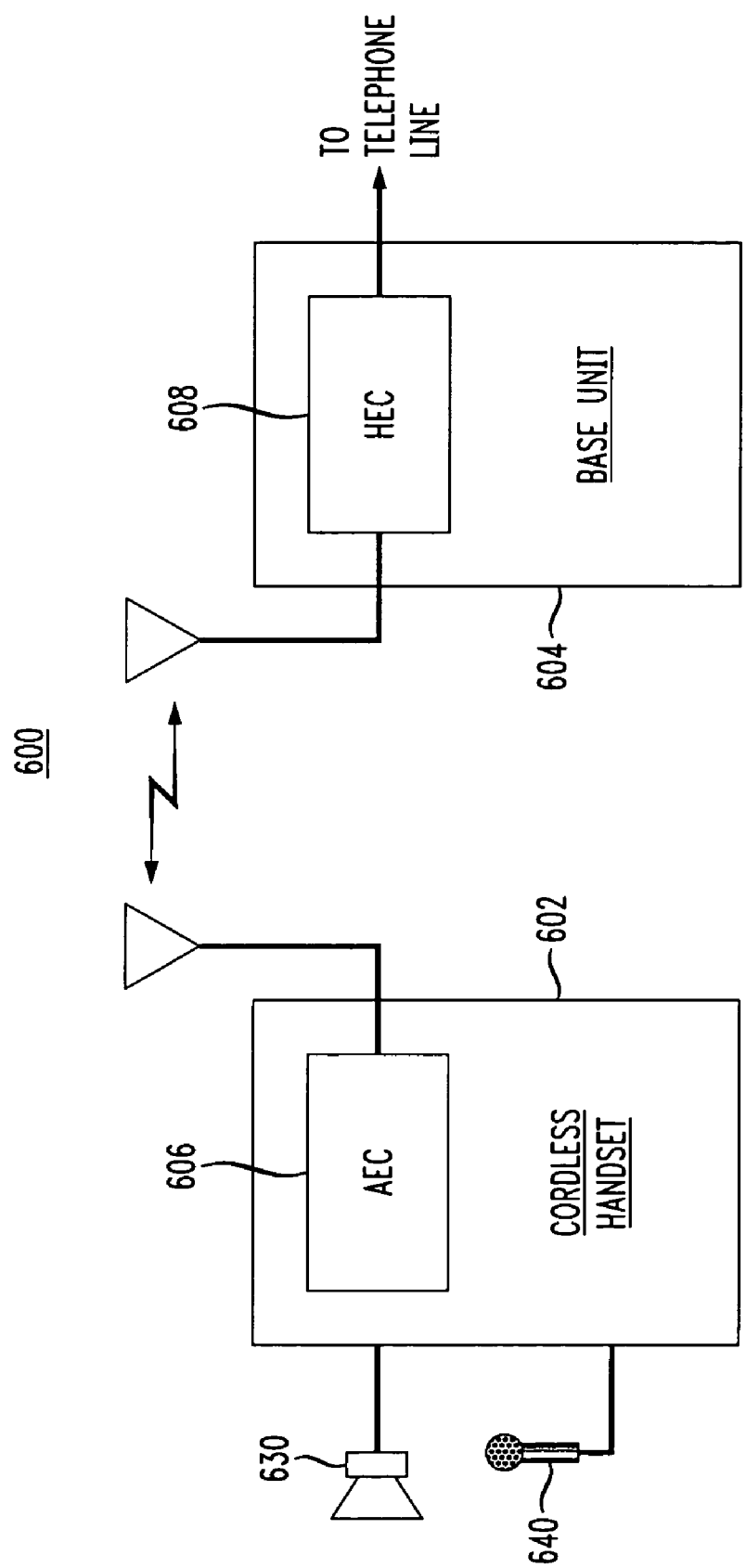
FIG. 6 shows the relevant portion of a conventional cordless telephone including a conventional AEC in the cordless handset and a conventional HEC in the base unit.

FIG. 3 shows the control register 202 in more detail. The control register 202 outputs settings for switchable parameters in the configurable echo canceler 106 shown in FIG. 2.

In particular, the reconfigurability of the echo canceler 106 is provided by an on/off type bit setting for each of the following: long/short span select 502, step size for quick or slow adaptation 504, tap refresh on or off 506, adaptation mode (NLMS or recursive least square) 508, sub-band or full-band center clipper 510, and sub-band or full-band echo cancellation 512.

Long/short span select 502: The span of the echo canceler is selected based on the echo path in question. One aspect of an echo canceler is modeling the echo path impulse response. The length of the impulse response is different for differing applications. For example, typical acoustic echoes have a span of 17–50 milliseconds (mS) depending on room size. On the other hand, in the case of an HEC, typically only 7–15 mS is required.

In the disclosed embodiment, a choice of one or two spans is provided. A short span of 7–15 mS is preferred for configuration as an HEC, while a long span of 17–50 mS is preferred for configuration as an AEC. Of course, additional spans and/or spans of different length may be provided depending upon the particular application.

Step size for slow/quick adaptation 504: Step size is directly related to speed of adaptation, and is also related to a final mis-adjustment error after convergence of the echo canceler taps. If the step size is large, the mis-adjustment error will be large. The converse is also true. For an HEC, the echo path remains fixed, so the step size can be small because the speed of adaptation is therefore not important. However, for an AEC, the echo path can change so the step size should be large. Thus, a small step size is preferred for configuration of the reconfigurable echo canceler 106 as an AEC. Of course, additional step sizes or alternative step sizes may be provided within the principles of the present invention.

Tap refresh on/off 506: In certain instances, it is desirable for the echo canceler taps to be continuously updated. For example, an optimal set of taps may be created for an HEC (having a fixed echo path) and tap refresh (i.e., tap update) may not be desirable. However, for an AEC, tap refresh or update may be always enabled due to the typically changing echo path. Thus, if the configurable echo canceler 106 is being configured as an HEC, the tap refresh 506 is preferably set to an OFF condition using the register settings 202, or if being configured as an AEC, the tap refresh 506 is preferably set to an ON condition.

Adaptation mode (NLMS or RLS) 508: There are several conventionally available adaptation algorithms. In general, greater speed of adaptation and smaller mis-adjustment is achievable with more complex algorithms which require more MIPS and memory. Depending upon the particular application, a less or more complex configurable echo cancellation algorithm may be used and configured as necessary in accordance with the principles of the present invention. For example, an HEC with a fixed echo path may preferably be set to NLMS, whereas an AEC may preferably be set to recursive least square (RLS) to provide for fast adaptation.

Sub-band or full-band center clipper 510: Center clipper is a signal processing block that attenuates signals below a given threshold and passes through signals above that given threshold. Center clipper is typically used to reduce residual echo. A full-band center clipper acts on a full band signal, whereas a sub-band center clipper first filters the signal into different frequency bands, and then independently center clips within each band.

Center clipping is a non-linear operation. Thus, a high center clipping threshold will introduce noise and distortion throughout the band. Therefore, a full band center clipper distorts full band, while a sub-band introduces distortion into only the band it's operating on. Accordingly, each threshold can be tuned separately in a sub-band center clipper.

Sub-band or full-band echo cancelation 512: In a sub-band center clipper as described above, the principles are the same. Here you can have an echo canceler which filters the entire band or a sub-band echo canceler which operates in different frequency bands.

FIGS. 4A and 4B show audio connections of the configurable echo canceler 106b in the base unit 104 as either an HEC (FIG. 4A) or as an AEC (FIG. 4B).

In particular, FIG. 4A shows a microphone input signal input to line A in FIG. 2, a telephone line out signal output from line B, a telephone line in signal input to line C, and a speaker out signal output from line D, when the configurable echo canceler 106b in the base unit 104 is configured as an HEC.

FIG. 4B shows a line in signal input to line A in FIG. 2, a speaker out signal output from line B, a microphone in signal input to line C, and a line out signal output from line D, when the configurable echo canceler 106b in the base unit 104 is configured as an AEC.

FIG. 5 shows audio connections of the configurable echo canceler 106a in the cordless handset receiver 102.

In particular, FIG. 5 shows a microphone in signal input to line A in FIG. 2, a handset out to the base unit or to the handset output from line B, a handset in signal from the base or the handset input to line C, and a handset speaker signal output from line D, when the configurable echo canceler 106a in the cordless handset receiver 102 is configured as an AEC.

FIGS. 4A, 4B and 5 show fixed audio connections of the configurable echo cancelers 106a, 106b. However, the audio connections may be operably switched to the configurable echo cancelers 106a, 106b, either using a digital switch, analog relay, or other means, to allow various modes for the telephone, e.g., a cordless telephone.

In particular, the principles of the present invention allow switchable operation of elements requiring one type echo canceler in a particular mode while requiring another type echo canceler in another mode. For instance, utilizing the principles of the present invention, a configurable echo canceler 106 in each of the cordless handset receiver 102 and base unit 104 allows operation of the cordless telephone 110 in either a normal mode, intercom mode, base speakerphone mode, or handset speakerphone mode.

In the normal mode wherein the cordless handset is used, the configurable echo canceler 106b in the base unit 104 may be configured as an HEC only, and the configurable echo canceler 106a in the cordless handset receiver 102 may not be necessary.

In the intercom mode, both the configurable echo canceler 106a in the cordless handset receiver 102 and the configurable echo canceler 106b in the base unit 104 may be configured as AECs.

In the base speakerphone mode, the configurable echo canceler 106b in the base unit 104 may be configured as both an HEC and an AEC, while the configurable echo canceler 106a in the cordless handset receiver 102 may be configured as an AEC.

In a handset speakerphone mode, the configurable echo canceler 106b in the base unit 104 may be configured as an HEC, while the configurable echo canceler 106a in the cordless handset receiver 102 may be configured as an AEC.

While the invention has been described with reference to the exemplary embodiments thereof, those skilled in the art will be able to make various modifications to the described embodiments of the invention without departing from the true spirit and scope of the invention.

What is claimed is:

1. An echo canceler, comprising:
    an echo canceler module configurable as one of an acoustic echo canceler and a hybrid echo canceler; and
    a control register adapted to configure said echo canceler module as said one of said acoustic echo canceler and said hybrid echo canceler;
    wherein said echo canceler module is configurable to operate through a common physical connection as said acoustic echo canceler in a first wireless device and as said hybrid echo canceler in a second wireless device; and
    said control register is adapted to select between sub-band center clipping and full-band center clipping with respect to said echo canceler module.

2. The echo canceler according to claim 1, wherein:
    said control register is adapted to configure a span length of said digital echo canceler module.

3. The echo canceler according to claim 2, wherein:
    said span length is adapted to be operably reconfigurable.

4. The echo canceler according to claim 1, wherein:

said control register is adapted to configure a step size relating to adaptation of said echo canceler module.

5. The echo canceler according to claim 4, wherein: said step size is adapted to be operably reconfigurable.

6. The echo canceler according to claim 1, wherein: said control register is adapted to configure an ability to update tap information relating to said digital echo canceler module.

7. The echo canceler according to claim 6, wherein: said ability to update tap information is adapted to be operably reconfigurable.

8. The echo canceler according to claim 1, wherein: said control register is adapted to select one of a plurality of possible adaptation modes of said echo canceler module.

9. The echo canceler according to claim 8, wherein: said selection between the plurality of possible adaptation modes is operably reconfigurable.

10. The echo canceler according to claim 1, wherein; said selection between sub-band center clipping and full-band center clipping is operably reconfigurable.

11. The echo canceler according to claim 1, wherein: said echo canceler module is adapted to configurably receive an input signal from two of:
a microphone,
a telephone line in, and
handset in.

12. The echo canceler according to claim 1, wherein; said first wireless device is a handset of a digital cordless telephone.

13. The echo canceler according to claim 1, wherein; said second wireless device is a base unit of a digital cordless telephone.

14. An echo canceler, comprising:
an echo canceler module configurable as one of an acoustic echo canceler and a hybrid echo canceler; and
a control register adapted to configure said echo canceler module as said one of said acoustic echo canceler and said hybrid echo canceler;
wherein said echo canceler module is configurable to operate through a common physical connection as said acoustic echo canceler in a first wireless device and as said hybrid echo canceler in a second wireless device; and
wherein said control register is adapted to select between sub-band echo cancellation and full-band echo cancellation.

15. The echo canceler according to claim 14, wherein: said selection between sub-band echo cancellation and full-band echo cancellation is operably reconfigurable.

16. The echo canceler according to claim 14, wherein: said first wireless device is a handset of a digital cordless telephone.

17. The echo canceler according to claim 14, wherein: said second wireless device is a base unit of a digital cordless telephone.

18. The echo canceler according to claim 14, wherein: said echo canceler module is adapted to configurably receive an input signal from two of:
a microphone,
a telephone line in, and
handset in.

19. The echo canceler according to claim 14, wherein: said control register is adapted to configure a span length of said echo canceler module.

20. The echo canceler according to claim 19, wherein: said span length is adapted to be operably reconfigurable.

21. The echo canceler according to claim 14, wherein: said control register is adapted to configure a step size relating to adaptation of said echo canceler module.

22. The echo canceler according to claim 21, wherein: said step size is adapted to be operably reconfigurable.

23. The echo canceler according to claim 14, wherein: said control register is adapted to configure an ability to update tap information relating to said echo canceler module.

24. The echo canceler according to claim 23, wherein: said ability to update tap information is adapted to be operably reconfigurable.

25. The echo canceler according to claim 14, wherein: said control register is adapted to select one of a plurality of possible adaptation modes of said digital echo canceler module.

26. The echo canceler according to claim 25, wherein: said selection between the plurality of possible adaptation modes is operably reconfigurable.

27. A method of configuring an echo canceler module as either an acoustic echo canceler or as a hybrid echo canceler, said method comprising:
configuring said echo canceler module as one of said acoustic echo canceler and said hybrid echo canceler, said configuring comprises selecting between sub-band center clipping or full-band center clipping with respect to said echo canceler module;
operating said echo canceler module as said acoustic echo canceler if said echo canceler module is utilized in a first wireless device; and
operating said echo canceler module as said hybrid echo canceller if said echo canceler module is utilized in a second wireless device;
wherein said echo canceler module is configurable to operate through a common physical connection as said acoustic echo canceler in said first wireless device and as said hybrid echo canceler in said second wireless device.

28. The method according to claim 27, wherein said configuring comprises:
changing a span length of said digital echo canceler module.

29. The method according to claim 27, wherein said configuring comprises:
changing an adaptation speed of said echo canceler module.

30. The method according to claim 27, wherein said configuring comprises:
changing an enablement status of a tap update ability of said echo canceler module.

31. The method according to claim 27, wherein said configuring comprises:
changing an adaptation mode of said echo canceler module.

32. A method of configuring an echo canceler module as either an acoustic echo canceler or as a hybrid echo canceler, said method comprising:
configuring said echo canceler module as one of said acoustic echo canceler and said hybrid echo canceler, said configuring comprising selecting between sub-band echo cancellation or full-band echo cancellation with respect to said echo canceler module;
operating said echo canceler module as said acoustic echo canceler if said echo canceler module is utilized in a first wireless device; and operating said echo canceler module as said hybrid echo canceller if said echo canceler module is utilized in a second wireless device;

wherein said echo canceler module is configurable to operate through a common physical connection as said acoustic echo canceler in said first wireless device and as said hybrid echo canceler in said second wireless device.

33. The method according to claim 32, wherein said configuring comprises:

changing a span length of said echo canceler module.

34. The method according to claim 32, wherein said configuring comprises:

changing an adaptation speed of said echo canceler module.

35. The method according to claim 32, wherein said reconfiguring comprises:

changing an enablement status of a tap update ability of said echo canceler module.

36. The method according to claim 32, wherein said configuring comprises:

changing an adaptation mode of said echo canceler module.

* * * * *